United States Patent [19]

Joslyn et al.

[11] Patent Number: 4,975,509

[45] Date of Patent: Dec. 4, 1990

[54] SILANE COMPOSITIONS FOR REINFORCEMENT OF POLYOLEFINS

[75] Inventors: Wallace G. Joslyn; Alfred D. Ulrich, III, both of Jacksonville; Michael E. Wilson, Middleburg, all of Fla.

[73] Assignee: PCR Group, Inc., Gainesville, Fla.

[21] Appl. No.: 274,288

[22] Filed: Nov. 21, 1988

[51] Int. Cl.$^5$ .............................................. C08F 30/08
[52] U.S. Cl. .................................... 526/279; 526/232
[58] Field of Search .............................. 526/279, 232

[56] References Cited

U.S. PATENT DOCUMENTS

| | | |
|---|---|---|
| 2,821,521 | 1/1958 | Price .................................... 526/279 |
| 3,471,439 | 10/1969 | Bixler et al. . |
| 4,317,765 | 3/1982 | Gaylord . |
| 4,429,064 | 1/1984 | Marzola et al. . |
| 4,481,322 | 11/1984 | Godlewski et al. . |
| 4,810,767 | 3/1989 | Furukawa et al. .................. 526/279 |

FOREIGN PATENT DOCUMENTS 60-170672  9/1985  Japan ................................... 526/279

*Primary Examiner*—Joseph L. Schofer
*Assistant Examiner*—N. Sarofim
*Attorney, Agent, or Firm*—Hedman, Gibson, Costigan & Hoare

[57] ABSTRACT

There are provided reinforcing additives, e.g., for polyolefins, comprising (a) a hydrolyzable silane having an ethylenically unsaturated amide substituent and (b) a free radical generator. Also provided is a single step method of using such additives with hydroxyl-containing reinforcements, such as mica to improve processability and physical and thermal resistance properties of reinforced resin compositions.

5 Claims, No Drawings

4,975,509

SILANE COMPOSITIONS FOR REINFORCEMENT OF POLYOLEFINS

This invention relates to two-component compositions useful to modify the performance of reinforced polymer compositions and, more particularly, to a reinforcing additive comprising at least one vinyl-polymerizable, unsaturated hydrolyzable silane and a free-radical generator. The reinforcing agents of this invention are especially useful for improving the adhesion of polyolefins to hydroxyl-containing mineral fillers, for example, glass, clay and mica. The invention further contemplates polyolefin compositions having enhanced properties due to the presence of such fillers and the said novel two-component compositions.

BACKGROUND OF THE INVENTION AND PRIOR ART

Organofunctional silanes are well known in plastic-forming technology as excellent coupling agents for bonding organic resins to reinforcement materials. Ordinarily, reinforcement materials are coated with and bonded to coupling agents and then intimately blended with the impregnating resins which in turn bond to functional groups on the coupling agents. Selection of the proper organofunctional silane is usually determined by choosing a coupling agent with a functional group that is capable of undergoing a known polymerization condensation with one or more of the functional groups of the impregnating resin. Proper matching of silane organic functional groups with those of the polymer resin is essential to the formation of a strong, thermally-resistant chemical linkage of the two materials. Polyolefins are especially difficult to reinforce with hydroxyl-containing reinforcements using most conventional silane coupling agents. This is evidenced by a lower than optimum property profile, especially resistance to impact and lowered heat deflection temperatures.

Various functional silanes, e.g., glycidoxypropyltrimethoxysilane and methacryloxypropyltrimethoxysilane have been used for many years to improve the adhesion of organic resins to inorganic reinforcements, like glass fibers, silica, wollastonite, clays, mica, asbestos and other hydroxyl-containing materials. The silanes hydrolyze and attach themselves to the surface hydroxyl groups leaving a polymer-compatible terminal function. Usually from about 0.05 percent to about 5 percent by weight of the reactive silane coupling agent based on the reinforcement additive is used.

Such a technique is not free from problems when polyolefins, such as polyethylene and polypropylene are used. Polyolefins blended with conventional silane-treated hydroxyl-containing fillers are difficult to mold because they have reduced flow, requiring higher molding pressures, and the resulting impact strengths and heat distortion properties are not optimum.

There still exists a need to provide improved properties of the overall composition. Specific types of property improvements are viscosity reduction, increased physical strength and thermal resistance. The prior art discloses several types of coupling agents tailored for use with polyolefin systems. In an early development, Bixler et al., U.S. Pat. No. 3,471,439, proposed a three-part system, which contained:

(1) an organic compound having a chemical affinity for the surface, which can be, but not necessarily is, one of the conventional organofunctional silanes mentioned above;

(2) an organic compound with at least two (2) polymerizable ethylenic unsaturations, such as 1,3-butylene glycol dimethacrylate; and (3) a free-radical generator such as an organic peroxide catalyst.

This three-part composition must be added when the filler is mixed with the matrix polymer. If the filler is to be treated prior to addition into the polymer matrix, however, two free-radical catalysts must be used. The first is a low-temperature free-radical generator required partially to react and bond the unsaturated material to the surface. The second is a high-temperature free-radical generator which will remain on the surface to react residual unsaturated material with the polymer matrix, at the time the polymer is processed. The high temperature free-radical generator must be tailored to the polymer material, in order to match the processing temperature associated with the polymer. The system is undesirably complex and commercially difficult to carry out.

Godlewski et al., U.S. Pat. No. 4,481,322, disclose a four-component system that can be added at the most convenient and economical point in the overall formulation procedure, i.e., either pretreating the filler or blending everything in the extruder hopper or injection molding machine hopper. However, in order to provide the improved physical and processing properties of Godlewski et al., the following four components are disclosed to be essential:

(1) a polymerizable unsaturated organic compound containing at least two polymerizable unsaturated groups, e.g., trimethylol propane triacrylate;

(2) a vinyl polymerizable unsaturated, hydrolyzable silane, e.g., gamma-methacryloxypropyl trimethoxysilane;

(3) a surfactant, such as a polysiloxane; and (4) a free-radical generator such as an organic peroxide.

The inclusion of a surfactant is an integral and necessary part of the Godlewski et al. compositions. A significant commercial drawback of such compositions is that the peroxide (4) and the polymerizable unsaturated organic compound (1) must be kept separate prior to actual blending into polymer matrix or treatment onto the surface of fillers. Therefore, its use requires that two or more of the components be added at the time of incorporation.

Gaylord, U.S. Pat. No. 4,317,765, discloses a two-part coupling agent that does not include a silane but is reported to provide polyolefin compositions having improved physical properties. The Gaylord composition is comprised of an ethylenically unsaturated carboxylic acid or anhydride, illustratively maleic anhydride, and a free-radical generator, such as an organic peroxide.

According to the Gaylord disclosure, the coupling agent may be incorporated by a one-step method directly into the polymer composition, or by a two-step method whereby the filler particles are encapsulated with a polymer material via the coupling agent. The encapsulating polymer may or may not be the same as the matrix polymer in the final composition. Preferably, the coating and matrix polymer are of the same chemical species, however, with the matrix polymer having a lower melt index and higher molecular weight than the coating material. In either the one-step or two-step process, the ethylenically unsaturated material, free-radical generator and polymer must be added simultaneously to produce the beneficial results, making the mixing requirements and order of addition critical to overall performance and introducing significant commercial processing drawbacks. A five-fold decrease in Izod Impact Strength was observed when orders of addition were varied.

Marzola et al., U.S. Pat. No. 4,429,064, disclose mica-reinforced polyolefin compositions comprising a maleamic silane modifier. The mica is pretreated with from 0.01 to 7 percent by weight of a modifier, typically of formula

wherein Z is a(n) aliphatic, aromatic, cycloaliphatic or heterocyclic divalent radical, R is $C_{1-6}$ alkoxy, or halogen, and n is 1-3. The modified mica is blended with polypropylene and the physical properties, heat distortion temperature and melt flow are found to be improved somewhat over those obtained with unmodified mica.

The present invention overcomes the problems of the prior art by providing a stable, two-component reinforcing additive composition which can be added to the filler at a convenient point in a single step. It can also be used as pretreatment onto filler particles without a polymer material present to encapsulate the particle and eliminate the need for a surfactant.

Unlike both Bixler et al. and Godlewski et al., there is also no need to include a component having at least two vinyl functions as an essential component. Unlike Godlewski et al. it is unnecessary to include a surfactant as an essential component, and the two component system discovered herein provides better heat distortion temperature, impact strength and flow properties in polypropylene than does the Godlewski et al. compositions, which represent the current state-of-the-art. In contrast to Gaylord, the present additives do not require critical mixing steps to achieve high, reproducible physical properties. In comparison, with the single component coupling agent of Marzola et al. it has been discovered that inclusion of a free radical generator in a maleamic silane modifier provides a vast and entirely unexpected improvement in ultimate properties and processability of difficult to reinforce polyolefin compositions.

SUMMARY OF THE INVENTION

According to the present invention there are provided reinforcing additives for use in a reinforcing inorganic filler mixture, said additive comprising:

(a) a vinyl-polymerizable unsaturated, hydrolyzable silane of the formula

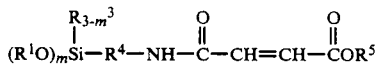

wherein $R^1$ and $R^3$ are independently selected from $C_1$-$C_8$ monovalent hydrocarbyl radicals, $R^4$ is alkylene containing from 1 to 12 carbon atoms; $R^5$ is hydrogen or a $C_1$-$C_8$ monovalent hydrocarbyl radical, and m is a whole number of from 1 to 3; and (b) a free radical generator.

Also provided by the present invention are reinforcing filler mixtures for a polyolefin resin, said mixture comprising:

(1) from 20 to 99.9 parts by weight of an inorganic hydroxyl-containing filler; and (2) from 0.1 to 80 parts by weight of an additive comprising:

(a) a vinyl polymerizable unsaturated, hydrolyzable silane of the formula

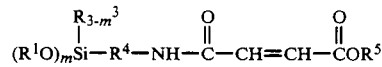

wherein $R^1$ and $R^3$ are independently selected from $C_1$-$C_8$ monovalent hydrocarbyl radicals, $R^4$ is alkylene containing from 1 to 12 carbon atoms; $R^5$ is hydrogen or a $C_1$-$C_8$ monovalent hydrocarbyl radical, and m is a whole number of from 1 to 3; and (b) a free radical generator.

The invention also contemplates reinforced polymer compositions comprising:

A. an olefinic homopolymer or copolymer integrally blended with the individual components of B. an effective reinforcing amount of a reinforcing filler mixture, said mixture comprising (1) from 20 to 99.9 parts by weight of an inorganic hydroxyl-containing filler; and (2) from 0.1 to 80 parts by weight of an additive comprising:

(a) a vinyl polymerizable unsaturated, hydrolyzable silane of the formula

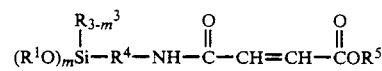

wherein $R^1$ and $R^3$ are independently selected from $C_1$-$C^8$ monovalent hydrocarbyl radicals, $R^4$ is alkylene containing from 1 to 12 carbon atoms; $R^5$ is hydrogen or a $C_1$-$C_8$ monovalent hydrocarbyl radical, and m is a whole number of from 1 to 3; and (b) a free radical generator.

As further embodiment, the invention provides methods of reinforcing a polyolefin resin which comprise blending an olefinic polymer or copolymer with an effective reinforcing amount of a reinforcing filler mixture as defined above until substantially homogeneous mixture is obtained.

Special mention is made of compositions and methods wherein the silane comprises a compound of the formula

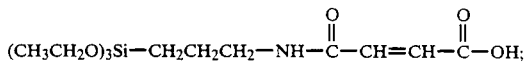

the free radical generator comprises an organic peroxide, especially 1,4-di-(2-tert-butyl-peroxyisopropyl) benzene; the reinforcing filler comprises glass, clay, mica, or a mixture thereof; and the polyolefin comprises polyethylene, polypropylene or a mixture thereof.

DETAILED DESCRIPTION OF THE INVENTION

As indicated above the compositions of the present invention are especially useful to improve the physical properties e.g., reinforcement and hydrolytic stability, of polymer compositions.

The vinyl-polymerizable unsaturated hydrolyzable silanes used as component (a) are commercially available and they can be made by procedures well known to those skilled in the art. Reference is made to the above-mentioned patent of Marzola et al., U.S. Pat. No. 4,429,064. Typically a terminally-amino-substituted monoalkyl, alkoxy/alkyl silane is reacted with maleic acid or anhydride or an ester thereof to produce the maleamic silane. The preferred compound, as set forth above, can be made by reacting gamma-aminopropyl-triethoxysilane with maleic anhydride at about 70° C. in a nitrogen atmosphere in a molar ratio of 1:1 in accordance with such procedures.

Suitable free radical generators for use as component (b) can comprise inorganic and/or organic compounds which comprise a family well known to those skilled in this art. See, for example, the disclosure in the Bixler et al., Godlewski et al. and Gaylord patents mentioned above. The organic peroxides are preferred as free radical generators; they illustratively comprise compounds of the type listed in the following table:

| Catalyst | Temp ° C. | Half Life Minutes |
|---|---|---|
| 1,4-di-(2-tert-butyl peroxy-isopropyl)benzene (40%) | 150 | 6 |
| 2,5-dimethylhexyl-2,5-di(perbenzoate) | 130 | 18 |
| cyclohexanone peroxide | 130 | 20 |
| t-butyl peracetate | 130 | 24 |
| 1,1-di-t-butyl peroxy-3,3,5-tri-methyl-cyclohexane (40%) | 130 | 24 |
| t-butyl di(perphthalate) | 130 | 30 |
| 2,5-dimethyl-2,5-di(t-butyl peroxy)hexane | 150 | 18 |
| dicumyl peroxide | 150 | 12 |
| dicumyl peroxide | 170 | 1.5 |
| benzoyl peroxide | 115 | 8 |
| benzoyl peroxide | 130 | 1.2 |
| benzoyl peroxide | 135 | 1 |
| t-butyl perbenzoate | 130 | 30 |
| t-butyl perbenzoate | 170 | 2 |
| di-t-butyl peroxide | 170 | 9 |
| di-t-butyl peroxide | 180 | 3 |
| 2,4,6-tri-(t-butyl peroxy)triazine | 170 | 1 |
| t-butyl peroxy acid phthalate | 170 | 1 |
| bis-(t-butyl peroxy)diPhenylsilane | 170 | 30 |

Special mention is made of 1,4-di-(2-tertbutylperoxyisopropyl)benzene, which is available at a 90 percent by weight active ingredient content from AKZO Chemie under the trade designation PERKDOX®14; 2,5-dimethyl-2,5-di(t-butyl peroxy)hexane and 2,5-dimethyl-2,5-di(t-butyl peroxy)hexyne-3.

The inorganic hydroxyl-containing filler used as component (1) can vary widely in type and amount. Such fillers form a family whose limits are well known to those skilled in this art. See, for example the disclosures in Bixler et al., Godlewski et al., and especially Gaylord, mentioned above.

The materials containing hydroxyl groups used in the practice of this invention may be any of the well known inorganic hydroxyl containing filler materials described above or reinforcing agents such as silicious materials, e.g., clay, sand, wollastonite, glass, quartz, diatomaceous earth, mica, silica, asbestos, talc, and kaolinite; hydrated or partially hydrated metal oxides, e.g., titania, zirconia, vanadia, alumina, chromia, zinc oxide, magnesium oxide and boron oxides; carbonates, e.g., limestone and chalk; etc. The filler material may be either a synthetic or a naturally occuring material and, if naturally occurring, may be used in either the purified or unpurified form. Special mention is made of glass, clay, mica or a mixture of any of them, and particularly mica.

Almost any polymer will benefit from inclusion of the reinforcing additive of this invention. In general, they will comprise thermoplastic polymers having labile atoms which provide sites for the formation of free radicals. Illustratively, these include polymers of olefins (e.g., homopolymers and copolymers) with polar monomers (e.g., ethylene-vinyl acetate copolymers); acrylic resins or elastomers (e.g. homopolymers and copolymers with each other or with other monomers of methyl acrylate, methyl methacrylate, ethyl acrylate, ethyl methacrylate, butyl acrylate, butyl methacrylate, acrylic acid and methacrylic acid); polystyrene; copolymers of styrene and other vinyl monomers such as acrylonitrile; vinyl polymers such as homopolymers and copolymers of vinyl acetate, vinyl chloride, alkyl vinyl ether and vinyl butyral; homopolymers and copolymers of dienes such as polybutadiene, polyisoprene, polychloroprene, butadiene-styrene copolymers, isobutylene-isoprene copolymers and other unvulcanized elastomers including natural rubber. Chemical derivatives of such polymers and copolymers of ethylenically unsaturated monomers of dienes, e.g., chlorinated polyethylene, chlorinated polypropylene, chlorinated isoprene copolymers, salts of ethylene-maleic anhydride, ethylene-acrylic acid, ethylene-methacrylic acid, styrene-maleic anhydride, alkyl vinyl ether-maleic anyhdride, butadiene-maleic anhydride and isoprene-maleic anhydride copolymers, and completely or partially hydrolyzed ethylene-vinyl acetate copolymers may also be used. Polymers of cyclic monomers, e.g., homopolymers and copolymers of ethylene oxide, propylene oxide, tetrahydrofuran, propiolactone, caprolactone, caprolactam and ethylene imine, may also be used. Copolymers of carbon monoxide and sulfur dioxide e.g., copolymers of carbon monoxide with ethylene and ethylene imine and copolymers of sulfur dioxide with alphaolefins, styrene, vinyl chloride and butadiene may also be used. Homopolymers and copolymers of carbonyl compounds e.g., homopolymers and copolymers of formaldehyde, acetaldehyde, butyraldehyde, chloral, etc., may also be used. Condensation polymers may also be used such as polyesters and alkyd resins which are obtained by the condensation of a polyhydric alcohol and a polycarboxylic acid. Examples of polycarboxylic acids which may be used to form the polyester resin include phthalic acid, phthalic anhydride, succinic acid, adipic acid, isophthalic acid, terephthalic acid, maleic anhydride, etc. The polyhydric alcohols which may be used in the preparation of the polyester of alkyd resin may include the glycols, such as ethylene glycol, propylene glycol, etc. Polyamide resins, e.g., polymers obtained by the condensation of a polycarboxylic acid such as adipic acid, terephthalic acid and dimer acid with a polyamine such as ethylene diamine, hexamethylene diamine and diethylene triamine, and polyimide resins may also be used. Polyurethanes e.g., polymers obtained by reaction of a diisocyanate such as toluene diisocyanate and 4,4'diphenylmethane diisocyanate with a polyol such as polyethylene oxide, polypropylene oxide, polytetramethylene glycol, hydroxyl-terminated polyesters, hydroxyl-terminated polyisobutylene and hydroxyl-terminated polybutadiene may also be used. Other themoplastic resins based on bisphenol such as polycarbonates, polysulfones and polysulfates as well as poly-2,5-dimethylphenylene oxide may also be used. Epoxy resins include the condensation products of bisphenol and epichlorohydrin, epoxidized drying oils, the glycidyl ethers of glycerol, epoxylated novolac resins, etc. The thermoplastic resin may be a resin which is capable of being thermoset or cured but which is contacted with the hydroxyl group containing material at temperatures and conditions which will not thermoset or cure the resin. Such resins include silicone resins and elastomers and acrylic resins. The labile atom on the polymer may be for instance, a hydrogen atom or a halogen atom.

The preferred themoplastic polymers are polyolefins, including homopolymers and copolymers of olefins such as ethylene, propylene, 1-butene, etc. The olefin monomers from which the polyolefin is formed preferably contain from 2 to 20 carbon atoms. The most especially preferred polyolefin is polypropylene. Oxidized polyolefins may also be used. Also preferred are thermoplastic polyimides, e.g. Pyrolin ® and Durimid ®; Kerimid 601 ® and Kinel ® from Rhone-Poulenc; and Vespel ® and Kapton ® from DuPont.

Thermoplastic polymers having labile atoms which provide sites for the formation of free radicals, in addition to those previously enumerated, include various nylons, polyesters such as polybutylene terephthalate, polycarbonates, polystyrene and styrene copolymers such as styrene-acrylonitrile copolymer, polyacetals, cellulose esters such as cellulose acetate and cellulose propionate, polyphenylene oxide and blends thereof with polystyrene and mixtures of polyolefins such as polyethylene and polypropylene.

As stated earlier, the method of this invention comprises integrally blending the thermoplastic organic polymer with the individual components of a reinforcing filler mixture.

The blend of reinforcing filler mixture and polymeric matrix, e.g., the thermoplastic organic polymer, can be made at ambient temperatures in a suitable mixing apparatus, such as a Hobart mixer, to uniformly distribute the components throughout the matrix. If desired, the vinyl polymerizable unsaturated, hydrolyzable silane, and the free radical generator (collectively referred to hereinafter as the reinforcing additives) can be incorporated into the filler by ordinary mixing without the need for a high shear operation or it can be mixed with the polymeric matrix which is in granular or powdered form. All of these mixing operations can be performed at any convenient time or point in the formulation procedure. The reinforcing additives can also be added to the polymeric matrix before, during, or after its formation by polymerization. The reinforcing additives can be added to the coarse filler material as it is received from the mine and such addition can be performed before, during or after grinding of the filler to the desired particle size. An advantage of this invention is that the point of addition of the reinforcing additives can be conducted at the most convenient and economical point in the overall formulation procedure including additions as pointed out above to the starting matrials prior, during or after their formation or processing.

Integral blending of the additives has a substantial economic advantage over a pre-treated filler which involves savings in time and energy, and provides convenience and simplicity. Pre-treatment of a filler with an additive, e.g. a coupling agent, is a separate operation requiring a high intensity mixer like a Henschel or twin-shell blender equipped with a revolving high RPM intensifier mixing blade to prevent agglomeration. The reinforcing additives must be added slowly at a steady flow rate to prevent agglomeration. During the pre-treatment step, localized high temperatures are encountered at or near the high speed mixing blades of the equipment employed. This prevents introducing a resin to the filler because the resin would melt and result in agglomeration.

In utilizing the integral blending technique, the reinforcing additives must be capable of dispersing the filler and the reinforcing additives must also be capable of being uniformly distributed throughout the filler. This prevents agglomeration. In integral blending according to this invention, the reinforcing additives can be added rapidly (one-shot) to the filler or filler/resin mixture followed by gentle agitation. Low level usage of the reinforcing additives, while still maintaining benefits of the reinforcing additives, is a substantial and unexpected advantage of this preferred feature. Furthermore, the reinforcing additives can be integrally blended according to this invention directly into the processing equipment (e.g., Banbury) containing the filler/resin mixture and prior to the fluxing stage of the melt composite. For these reasons integral blending is a preferred embodiment of the present invention.

The amount of reinforcing filler blended with the thermoplastic organic polymer may vary over a wide range depending upon the particular end-use application. Usually the reinforcing filler mixture is at least five (5°) percent by weight, of the filled thermoplastic polymer blend to obtain a substantial effect on the physical and processing characteristics. It is rarely desirable that the reinforcing filler mixture exceed eighty-five (85°) percent by weight of the filled thermoplastic polymer blend. Of the reinforcing filler mixture, the reinforcing additives may vary from about 0.1 to 80 parts by weight, the remainder being the inorganic filler. Of the reinforcing additives, for every 100 parts by weight of the vinyl-polymerizable unsaturated hydrolyzable silane the free radical generator will be present in an amount from about 0.1 to 25 parts by weight. Within these limits the preferred amount of each component will depend largely upon the choice of components in general and the specific end use application. For these reasons further limitations of the ratio of components to one another cannot be provided without detracting from the spirit of the present invention.

In addition to the additives, previously discussed in detail, other ingredients conventionally used in such compositions may also be incorporated. These include where appropriate, platicizer, vulcanizing agents, cross-linking agents, lubricants, antioxidants, dyes, pigments, and the like.

DESCRIPTION OF THE PREFERRED EMBODIMENT

The following examples illustrate the present invention but are not to be construed as limiting the claims in any manner.

EXAMPLE 1

To 527 parts by weight of an organofunctional silane of the formula

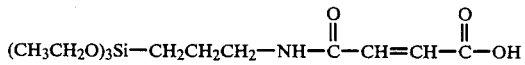

was added 31.36 parts by weight of 1,4-di(2-tertbutyl-peroxyisopropyl)benzene (AKZO Chemie PERKDOX 14). The stability of this reinforcing additive composition was evidenced by the fact that it was stored in a sealed container as long as two months prior to use, without any loss in performance.

EXAMPLE 2

The reinforcing additive of Example 1 was coated onto the surface of mica (HAR-160 from KMG Minerals, Inc., Kings Mountain, N.C.), at 1.0 percent by weight based on the weight of mica. The coated mica was dried at 100° C. for 2 hours to produce a reinforcing filler mixture in accordance with this invention.

EXAMPLE 3

The treated mica of Example 2, 40 parts by weight was blended with 60 parts by weight of polypropylene powder (Profax-6523 pm from Hercules, Inc.) for 10 minutes in a PK blender. The dry blend was extruded in a Brabender twin screw extruder, pelletized, and then molded in an injection molding machine at 700 psi into test specimens comprising polyolefin compositions reinforced in accordance with the present invention.

EXAMPLES 4 AND 5

A reinforcing additive in accordance with Example 1 was coated onto the surface of the same mica, but at 2 percent by weight based on the weight of the mica. The resulting reinforcing filler mixture parts by weight was melt blended with 60 parts by weight of polypropylene powder and molded and tested following the procedure of Example 3.

COMPARATIVE EXAMPLES 2A and 4A

For comparison purposes, Union Carbide Corporation's Ucarsil PC-1A/PC-1B (3:1 w/w) was treated onto mica at 1.0 percent and 2.0 percent by weight based on weight of mica, and dried as described in Examples 2 and 4. The Union Carbide product is disclosed in Godlewski, et al., U.S. Pat. No. 4,481,322, and represents current state-of-the-art.

COMPARATIVE EXAMPLE 3A AND 5A

Blends comprising 40 parts by weight of the prior art reinforcing additives of Comparative Examples 2A and 4A with 60 parts be weight of the same polypropylene powder used in Examples 3 and 5 were extruded, molded and tested by ASTM methods following the procedure of Example 3 but using a 900 psi injection molding pressure.

The properties obtained on the molded workpieces are set forth in the Table:

| Table Mica Reinforced Polypropylene | | | | |
|---|---|---|---|---|
| | Examples | | Comparative Examples | |
| | 3 | 5 | 3A | 5A |
| Percentage of silane/peroxide on mica | 1.0 | 2.0 | 1.0 | 2.0 |
| Flexural Strength psi | 10,660 | 11,430 | 10,300 | 10,700 |
| Flexural Modulus psi | 940 | 940 | 945 | 950 |
| Tensile Strength psi | 6,360 | 6,330 | 6,400 | 6,400 |
| Tensile Modulus psi | 649 | 560 | 627 | 619 |
| Izod Impact Strength ft–lb/in | 0.45 | 0.42 | 0.40 | 0.43 |
| Gardner Impact Strength ft–lb | 3.01 | 3.85 | 2.70 | 2.90 |
| Heat Deflection Temp. ° F. at 264 psi | 239 | 253 | 227 | 234 |

The data in the table show that flexural strength, Gardner impact strength, and heat deflection temperature are significantly improved when the mica is used with the reinforcing additive of this invention, when compared to a current state-of-the-art reinforcing additive. The increase in heat deflection temperature is very significant and is useful for extending the use of mica-reinforced polypropylene into applications for which it cannot now be used.

A further benefit observed in the processing of Examples 3 and 5 of the present invention is that the injection pressure of the molding machine should be reduced from conventional 900 psi, used with comparative Examples 3A and 5A, to 700 psi. This reduction is desirable to mold without excessive flashing. The increased flashing is a result of the better flow properties associated with the reinforcing additive of this invention. This improved flow property is advantageous for increasing throughput efficiency of injection molding equipment and the ability to completely fill intricate molds. It also enables higher filler loadings to be used.

EXAMPLE 6

A composition according to this invention can be prepared by integrally blending the dry reinforcing additive composition of Example 2, mica, and polypropylene powder used in Example 3. The dry blend is extruded, pelletized, injection molded into workpieces and tested.

The above-mentioned patents and publications are incorporated herein by reference.

Many variations of this invention will occur to those skilled in the art in light of the above, detailed description. For example, instead of polypropylene, polyethylene, or a random block ethylene/propylene copolymer, or a poly(4-methylpentene-1), or poly(butene-1) can be used. Instead of mica, ⅛ inch chopped glass fibers or clay can be used. Instead of the peroxide exemplified, dicumyl peroxide can be used. All such obvious variations are within the full intended scope of the appended claims.

What is claimed is:

1. A reinforcing additive for use in a reinforcing inorganic filler mixture, said additive comprising:
   (a) a vinyl-polymerizable unsaturated, hydrolyzable silane of the formula $$(R^1O)_m Si \overset{R^3_{3-m}}{\underset{|}{}} - R^4 - NH - \overset{O}{\underset{\|}{C}} - CH = CH - \overset{O}{\underset{\|}{C}} OR^5$$

wherein $R^1$ and $R^3$ are independently selected from $C_1$-$C_8$ monovalent hydrocarbyl radicals, $R_4$ is alkylene containing from 1 to 12 carbon atoms; $R^5$ is hydrogen or a $C_1$-$C_8$ monovalent hydrocarbyl radical, and m is a whole number of from 1 to 3; and (b) a free radical generator.

2. A reinforcing additive as defined in claim 1 wherein component (a) is of the formula

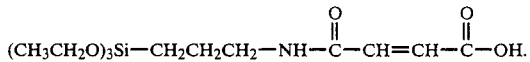

3. A reinforcing additive as defined in claim 1 wherein component (b) comprises an organic peroxide.

4. A reinforcing additive as defined in claim 3 wherein said organic peroxide comprises 1,4-di-(2-tert-butylperoxyisopropyl)benzene.

5. A reinforcing additive as defined in claim 1 wherein component (b) comprises from about 0.1 to about 25 parts by weight per 100 parts by weight of component (a).

* * * * *